United States Patent
Roberge

(10) Patent No.: US 11,268,530 B2
(45) Date of Patent: Mar. 8, 2022

(54) VARIABLE SPEED BOOST COMPRESSOR FOR GAS TURBINE ENGINE COOLING AIR SUPPLY

(71) Applicant: United Technologies Corporation, Farmington, CT (US)

(72) Inventor: Gary D. Roberge, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/831,955

(22) Filed: Mar. 27, 2020

(65) Prior Publication Data

US 2020/0362868 A1 Nov. 19, 2020

Related U.S. Application Data

(63) Continuation of application No. 15/242,701, filed on Aug. 22, 2016, now Pat. No. 10,746,181.

(51) Int. Cl.

| | |
|---|---|
| *F04D 19/02* | (2006.01) |
| *F04D 25/16* | (2006.01) |
| *F04D 27/00* | (2006.01) |
| *F04D 29/58* | (2006.01) |
| *F16H 3/72* | (2006.01) |

(Continued)

(52) U.S. Cl.
CPC .............. *F04D 25/163* (2013.01); *F02C 7/18* (2013.01); *F02C 7/32* (2013.01); *F02C 9/18* (2013.01); *F04D 19/02* (2013.01); *F04D 27/004* (2013.01); *F04D 27/009* (2013.01); *F04D 29/582* (2013.01); *F16H 3/72* (2013.01); *F05B 2220/302* (2013.01); *F05B 2260/211* (2013.01); *F05B 2260/40311* (2013.01); *F05D 2220/3218* (2013.01); *F05D 2260/211* (2013.01); *F05D 2260/406* (2013.01);

(Continued)

(58) Field of Classification Search
CPC ...... F04D 25/163; F04D 18/02; F04D 27/004; F04D 27/009; F04D 29/582; F02C 7/18; F02C 7/32; F02C 9/18; F05B 2220/302; F05B 2260/211; F05B 2260/40311; F05B 2260/406; F05B 2260/904; Y02T 50/60; F05D 2220/3218
See application file for complete search history.

(56) References Cited

U.S. PATENT DOCUMENTS

| | | |
|---|---|---|
| 3,488,947 A | 1/1970 | Miller et al. |
| 4,086,019 A | 4/1978 | Poole |

(Continued)

OTHER PUBLICATIONS

European Search Report for European Application No. 17187277.3 dated Jan. 17, 2018.

*Primary Examiner* — J. Todd Newton
*Assistant Examiner* — Theodore C Ribadeneyra
(74) *Attorney, Agent, or Firm* — Carlson, Gaskey & Olds, P.C.

(57) ABSTRACT

A gas turbine engine has a compressor section with a low pressure compressor and a high pressure compressor having a downstream end. A cooling air system includes a tap from a location upstream of the downstream most location. The tap passes air to a boost compressor, and the boost compressor passes the air back to a location to be cooled. The boost compressor is driven by a shaft in the engine through an epicyclic gear system. A speed control changes the relative speed between an input and an output to the epicyclic gear system.

15 Claims, 5 Drawing Sheets

(51) Int. Cl.
  *F02C 7/32*   (2006.01)
  *F02C 7/18*   (2006.01)
  *F02C 9/18*   (2006.01)

(52) U.S. Cl.
  CPC ............... *F05D 2260/40311* (2013.01); *F05D 2260/904* (2013.01); *Y02T 50/60* (2013.01)

(56) References Cited

U.S. PATENT DOCUMENTS

| | | | |
|---|---|---|---|
| 5,392,614 | A | 2/1995 | Coffinberry |
| 5,724,806 | A | 3/1998 | Horner |
| 5,758,485 | A | 6/1998 | Frutschi |
| 6,134,880 | A | 10/2000 | Yoshinaka |
| 6,430,931 | B1 | 8/2002 | Horner |
| 7,284,377 | B2 | 10/2007 | Joshi et al. |
| 8,333,554 | B2 * | 12/2012 | Chaudhry ............... F02C 7/36 415/122.1 |
| 9,548,639 | B2 * | 1/2017 | Goi ............... H02K 7/108 |
| 9,850,819 | B2 | 12/2017 | Suciu et al. |
| 9,856,793 | B2 | 1/2018 | Zelesky et al. |
| 10,006,370 | B2 | 6/2018 | Suciu et al. |
| 10,221,862 | B2 | 3/2019 | Suciu et al. |
| 10,890,115 | B2 * | 1/2021 | Polly ............... F02C 7/36 |
| 2006/0010875 | A1 * | 1/2006 | Mahoney ............... F02C 3/13 60/772 |
| 2006/0260323 | A1 * | 11/2006 | Moulebhar ............. F02C 7/268 60/793 |
| 2006/0272313 | A1 * | 12/2006 | Eick ............... F02C 3/107 60/39.63 |
| 2008/0138195 | A1 | 6/2008 | Kern et al. |
| 2008/0250792 | A1 * | 10/2008 | Wang ............... F02C 7/224 60/806 |
| 2009/0196736 | A1 | 8/2009 | Sengar et al. |
| 2009/0293445 | A1 | 12/2009 | Ress, Jr. |
| 2010/0223904 | A1 | 9/2010 | Edwards |
| 2011/0101693 | A1 * | 5/2011 | Goi ............... F02C 7/275 290/46 |
| 2011/0296847 | A1 | 12/2011 | Williams |
| 2012/0243991 | A1 | 9/2012 | Han |
| 2013/0076120 | A1 * | 3/2013 | Wagner ............... B64D 33/00 307/9.1 |
| 2013/0247539 | A1 | 9/2013 | Hoppe |
| 2014/0106922 | A1 | 4/2014 | Hancox |
| 2014/0374109 | A1 | 12/2014 | Denton et al. |
| 2015/0176486 | A1 | 6/2015 | Menheere et al. |
| 2016/0047304 | A1 | 2/2016 | Schwarz et al. |
| 2016/0222814 | A1 | 8/2016 | Sheridan |
| 2016/0230601 | A1 | 8/2016 | Bettagere et al. |
| 2016/0237907 | A1 | 8/2016 | Merry et al. |
| 2020/0088102 | A1 * | 3/2020 | Roberge ............... F02C 7/143 |

* cited by examiner

VARIABLE SPEED BOOST COMPRESSOR FOR GAS TURBINE ENGINE COOLING AIR SUPPLY

CROSS-REFERENCE TO RELATED APPLICATION

This application is a continuation of U.S. patent application Ser. No. 15/242,701 filed on Aug. 22, 2016, now U.S. Pat. No. 10,746,181 granted Aug. 18, 2020.

BACKGROUND OF THE INVENTION

This application relates to a variable speed boost compressor for supplying cooling air for application in gas turbine engines.

Gas turbine engines are known and typically include a fan delivering air into a compressor where it is compressed and delivered into a combustor. In the combustor, the air is mixed with fuel and ignited. Products of this combustion pass downstream over turbine rotors, driving them to rotate.

As can be appreciated, components in the gas turbine engine can become quite hot. Thus, it is known to supply cooling air for selected components as a means of reducing operating temperature and enhancing durability. Historically, gas turbine engines have included a low pressure compressor and a high pressure compressor. The cooling air, particularly for high pressure turbine airfoils, has typically been tapped downstream of the high pressure compressor.

However, the cooling loads on the gas turbine engine are becoming higher. One recent example includes a gear reduction between a fan drive turbine and the fan. With the inclusion of this gear reduction, turbines rotate at a faster rate and the cooling load is increased.

SUMMARY OF THE INVENTION

In a featured embodiment, a gas turbine engine has a compressor section with a low pressure compressor and a high pressure compressor having a downstream end. A cooling air system includes a tap from a location upstream of the downstream most location. The tap passes air to a boost compressor, and the boost compressor passes the air back to a location to be cooled. The boost compressor is driven by a shaft in the engine through an epicyclic gear system. A speed control changes the relative speed between an input and an output to the epicyclic gear system.

In another embodiment according to the previous embodiment, the epicyclic gear system is a planetary gear system.

In another embodiment according to any of the previous embodiments, the shaft rotates with the high pressure compressor to drive a power takeoff to drive the epicyclic gear system.

In another embodiment according to any of the previous embodiments, the shaft rotates with the low pressure compressor to drive a power takeoff to drive the epicyclic gear system.

In another embodiment according to any of the previous embodiments, the speed control incorporates a system for selectively providing a resistance to one of the gears in the epicyclic gear system.

In another embodiment according to any of the previous embodiments, one of the gears is a ring gear.

In another embodiment according to any of the previous embodiments, a hydraulic pump rotates with the ring gear, and an output of the hydraulic pump is controlled to control the resistance on rotation of the ring gear.

In another embodiment according to any of the previous embodiments, a throttle valve is positioned downstream of the hydraulic pump and is controlled to restrict the flow from the hydraulic pump to in turn control the resistance on rotation of the ring gear.

In another embodiment according to any of the previous embodiments, a control selectively controls the resistance such that the boost compressor rotates at higher speeds during higher power operation of the gas turbine engine, and is rotating at slower speeds during lower power operation.

In another embodiment according to any of the previous embodiments, a friction brake provides the resistance to rotation of the ring gear.

In another embodiment according to any of the previous embodiments, a hydraulic pump rotates with one of the gears, and an output of the hydraulic pump is controlled to control the resistance on rotation of the one of the gears.

In another embodiment according to any of the previous embodiments, a throttle valve is positioned downstream of the hydraulic pump and is controlled to restrict the flow from the hydraulic pump to in turn control the resistance on rotation of the one of the gears.

In another embodiment according to any of the previous embodiments, a friction brake provides the resistance to rotation of the one of the gears.

In another embodiment according to any of the previous embodiments, a control selectively controls the resistance such that the boost compressor rotates at higher speeds during higher power operation of the gas turbine engine, and is rotating at slower speeds during lower power operation.

In another embodiment according to any of the previous embodiments, the speed control changes the relative speeds between the input and the outlet to achieve a desired pressure in the air passing to the location to be cooled.

In another embodiment according to any of the previous embodiments, the shaft rotates with a lower pressure compressor to drive a power takeoff to drive the epicyclic gear system.

In another embodiment according to any of the previous embodiments, the speed control changes the relative speeds between the input and the outlet to achieve a desired pressure in the air passing to the location to be cooled.

In another embodiment according to any of the previous embodiments, the speed control incorporates a system for selectively providing a resistance to one of the gears in the epicyclic gear system.

In another embodiment according to any of the previous embodiments, the one of the gears is a ring gear.

In another embodiment according to any of the previous embodiments, a hydraulic pump rotates with one of the gears, and an output of the hydraulic pump is controlled to control the resistance on rotation of the one of the gears.

These and other features may be best understood from the following drawings and specification.

DETAILED DESCRIPTION

Figure 1:
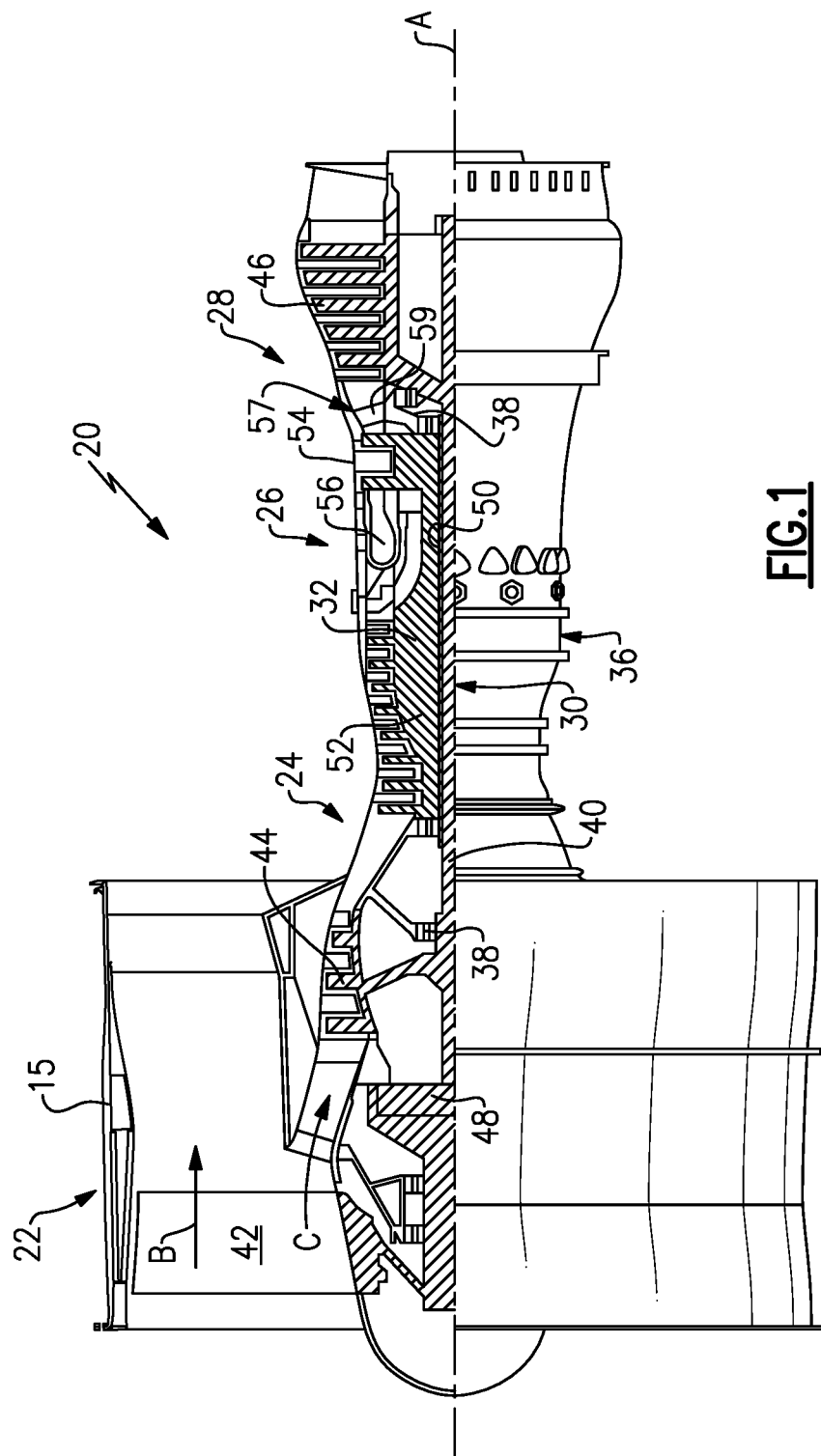
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
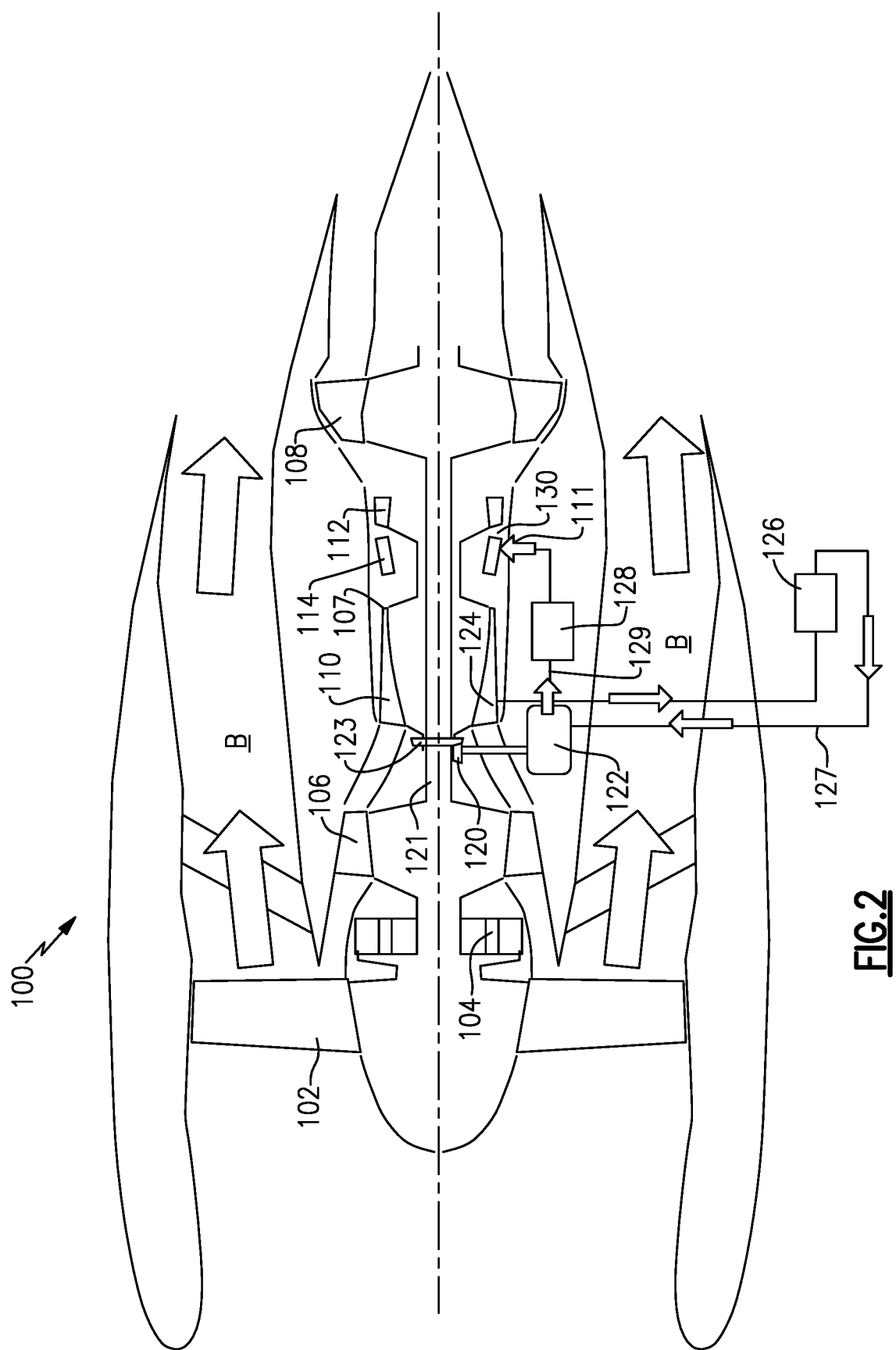
FIG. 2 shows a schematic view of a first embodiment gas turbine engine cooling air supply.

FIG. 2 shows an engine 100 including a high pressure compressor 110 rotating with a high pressure turbine 112. A low pressure compressor 106 rotates with a low pressure turbine 108. A fan rotor 102 is driven by a low speed shaft 121 through a gear reduction 104. The low pressure compressor 106 and the low pressure turbine 108, along with shaft 121, could be said to form a low speed or low pressure spool.

In this embodiment, cooling air is tapped at 124 from a location upstream of the downstream end 107 of the high pressure compressor 110. While the air is tapped in an upstream portion of the high pressure compressor 110, it may also be tapped from the low pressure compressor 106. The air is passed through a heat exchanger 126 and into a line 127 leading to a boost compressor 122.

Applicant has recognized that utilizing cooler air, from a location upstream of location 107, provides efficiency benefits to the gas turbine engine. One such benefit is that the impact on cycle thermal efficiency from the air from tap 124 will be much lower than the air at location 107 due to a reduction in work expended to provide additional compression in the high pressure compressor 110 between locations 124 and 107. As a result, the air at tap 124 will also be at a much lower temperature than the air at location 107. As such, the technical challenges associated with heat exchanger 126 design created by pressure and temperature for cooling the extracted air are diminished relative to a design that used full compressor discharge flow at 107. Use of an initial heat exchanger 126 to cool airflow prior to entering auxiliary boost compressor 122 may also positively impact the design of the compressor by allowing the use of materials that are lower temperature capable and potentially lighter.

While the heat exchanger 126 is shown outwardly of the engine 100, in practice, it may preferably be in the bypass duct B. Depending on the location of heat exchanger 126, heat rejection may be to the fan bypass stream B (see FIG. 1 or 2), the ambient free stream outside of the engine, or other sources.

It has been recognized that the air at the lower pressure from tap 124 alone, or combined with losses from heat exchanger 126, may have insufficient pressure to move into a location adjacent the high pressure turbine for cooling components in that area. For example the pressure of tap 124 may lack the desired positive outflow margin (cooling air at a higher pressure than the pressure of air surrounding a turbine component) to provide effective cooling.

As such, the boost compressor 122 will increase the pressure such that the air can be driven to perform its desired cooling function. A line 129 extends downstream from the compressor 122 through a second heat exchanger 128 and to an outlet 111 leading to a chamber 130 outside combustor 114. This air passes to cool high pressure turbine 112. As would be understood by a worker in this art, other locations for delivering the cooling air would come within the scope of this disclosure. While one heat exchanger 128 is shown, two or more may be included.

In the FIG. 2 embodiment, a gear 123 rotates with a high speed spool including the high speed compressor 110. This gear engages a power takeoff 120, which drives the boost compressor 122.

Figure 3:
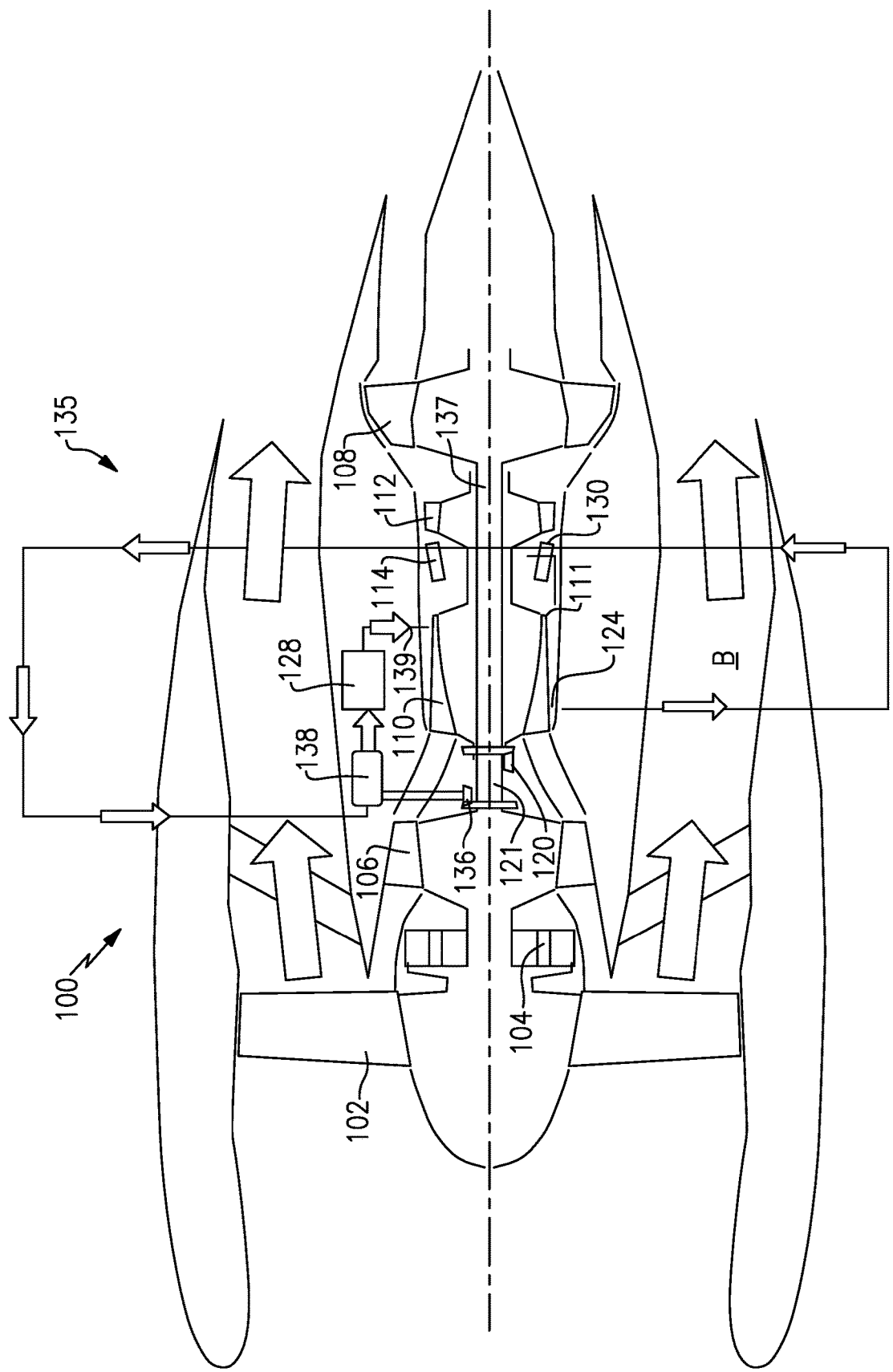
FIG. 3 shows a second embodiment.

FIG. 3 shows an engine 135 which is somewhat similar to the embodiment of FIG. 2. However, a power takeoff 136 goes from shaft 121 rotating with the low pressure/speed turbine 108. This power takeoff 136 drives a boost compressor 138.

Figure 4:
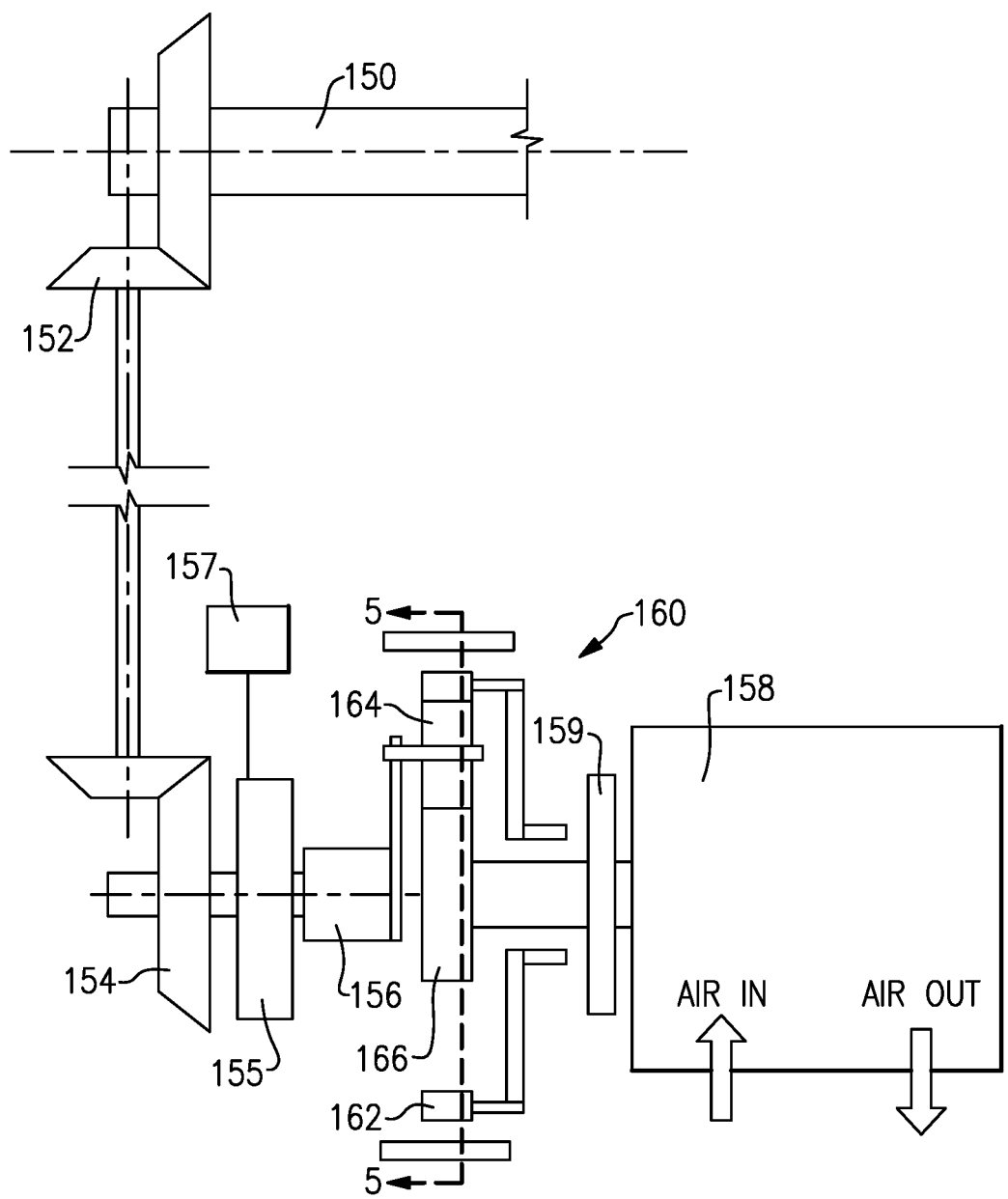
FIG. 4 shows a detail.

In either embodiment, it may be desirable to separate the speed of the boost compressor from that of the power takeoff. As such, a variable speed control is incorporated as is shown in FIG. 4. In the FIG. 4 embodiment, which could be utilized with either the arrangement of FIG. 2 or 3, an engine shaft 150 drives a power takeoff 152. The power takeoff 152 drives a gear 154 which, in turn, drives an input 156. An intermediate clutch 155 may be provided under the control of a control 157 to disconnect the input gear 154 from the drive 156. Drive 156 ultimately drives the boost compressor 158 through an epicyclic gear reduction 160. The gear reduction 160 is shown as a planetary gear, however, a star gear system could be used. The drive input 156 drives a plurality of planet gears 164. The planet gears rotate within a ring gear 162. When the planet gears 164 are driven to rotate, they, in turn, drive a sun gear 166, which drives the boost compressor 158.

As shown in FIG. 4, clutch 159 can replace clutch 155 and also disengage or allow the drive of the boost compressor 158.

Figure 5:
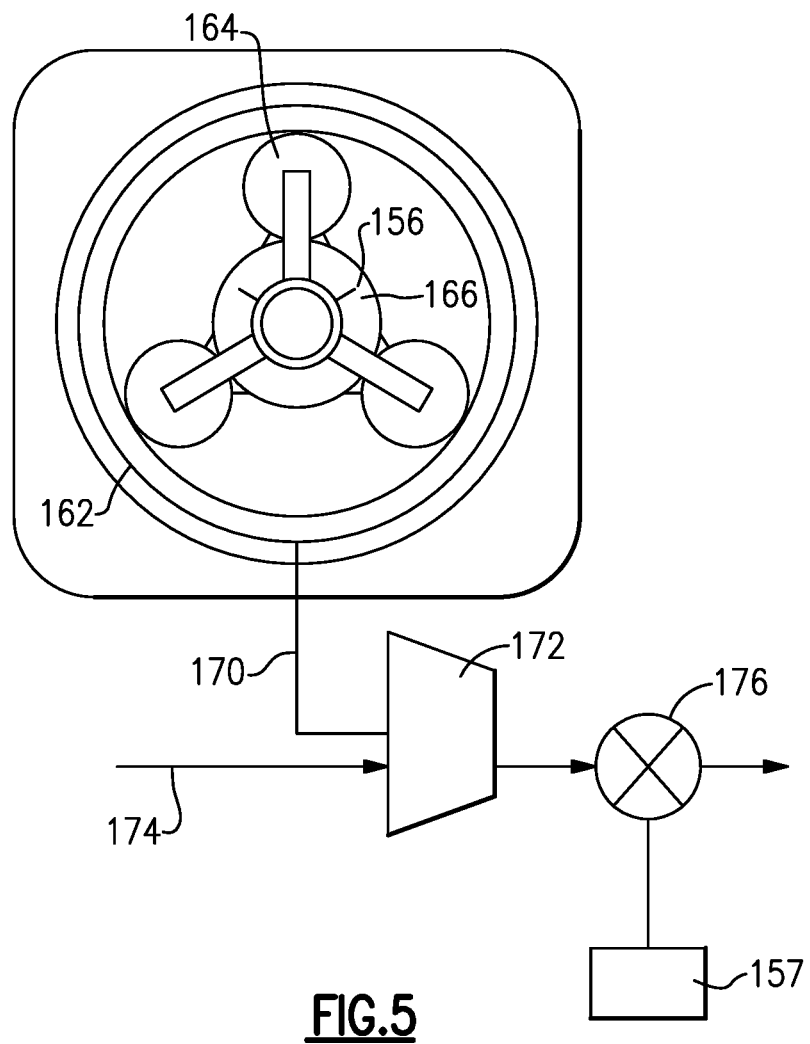
FIG. 5 shows a further detail.

A speed control for the epicyclic gearbox 160 is illustrated in FIG. 5. In FIG. 5, the ring gear 162 is shown provided with a shaft 170, which is connected to power a hydraulic pump 172. The hydraulic pump 172 may resist or allow rotation of the ring gear 162 depending on power loading, which, in turn, will control the speed of rotation of the planet gears 164 and, hence, the speed of the sun gear 166. In this embodiment, a hydraulic fluid supply 174 delivers hydraulic fluid to the pump 172. However, a throttle valve 176 is positioned downstream of the pump 172 and control 157 operates the throttle valve 176. As the throttle valve is opened, the hydraulic pump works freely and the ring gear 162 may rotate freely. Thus, minimal power is transmitted to the boost compressor.

It should be noted that the embodiment described uses a controlled power demand hydraulic pump 172 as a control input and other devices that yield a controlled power input to ring gear 162 are permissible. Options to affect the modulation of power split through gearbox 160 and eventual output to boost compressor 158 are therefore permissible Using the system described, when the speed of the boost compressor 158 is desirably increased, the throttle valve 176 begins to close providing a drag load on pump 172. As the hydraulic pump load increases the ring gear 162 will rotate slower. This will cause the planet gears 164 and sun gear 166 to increase in speed, as well as load, and the boost compressor will be able to rotate at faster speeds. This condition may be consistent with conditions where increased flow and/or pressure rise across the compressor 158 is desired Eventually, at very high power operation, the throttle valve 176 may be closed entirely. At this point, the hydraulic pump 172 will provide a braking load and the ring gear will stop rotating. The boost compressor 158 will then be rotating at its maximum speed and power. Conversely when the throttle valve 176 is moved to a fully open state, the hydraulic pump 172 is working at maximum capacity and minimal power is transmitted to the boost compressor 158

Figure 6:
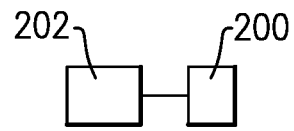
FIG. 6 schematically shows a friction brake used as a speed control.

FIG. 6 schematically shows a friction brake 200, which as in an optional approach allows or prevents rotation of the ring gear 202 for the reasons described above. This can replace the hydraulic pump of FIG. 5 and be controlled by control 157.

With these embodiments, the speed of the boost compressor can be controlled to be as desired rather than to simply follow the speed of the engine shafts. Independent boost compressor control therefor allows for coolant flow and pressure ratio tailoring independent of shaft speed.

As another example, the turbine cooling system uses a mixture of air from location 107 and 111 and the portion of air from location 111 is turned off through use of throttle valve control or clutch mechanisms previously described.

Using FIG. 2 as an example, the combined effect of engine bleed at location 124, cooling via heat exchanger 126, additional pressure boost with compressor 122 and additional cooling via heat exchanger 128 results in the coolant flow introduced at location 111 being cooler (lower in temperature) and at an equivalent level of pressure than if taken directly from compressor discharge location 107. It should be noted that variation in design parameters including in location of bleed 124, system losses in heat exchangers 126 and 128, line and ducting losses from 127 and 129, and compressor 122 can be used to independently set both the pressure and temperature of flow introduced at location 111 in comparison to what could be obtained at location 107. As a result with the embodiment shown, turbine durability can be enhanced and/or cooling flow reduced through means of a lower temperature coolant.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   a compressor section having a low pressure compressor and a high pressure compressor having a downstream most end;
   a cooling air system including a tap from a location upstream of said downstream most end, said tap passing air to a boost compressor, and said boost compressor passing the air back to a location to be cooled, said boost compressor being driven by a shaft in said engine through an epicyclic gear system, said shaft being driven by a power takeoff shaft driven by one of a low pressure shaft that drives said low pressure compressor, or a high pressure shaft which drives said high pressure compressor and there being a speed control for changing the relative speed between an input and an output to said epicyclic gear system;

wherein said speed control incorporates a system for selectively providing a resistance to one of the gears in said epicyclic gear system in order to achieve a desired speed for same boost compressor; and wherein said one of said gears is a ring gear.

2. The gas turbine engine as set forth in claim 1, wherein said epicyclic gear system is a planetary gear system.

3. The gas turbine engine as set forth in claim 2, wherein said shaft rotates with said high pressure compressor to drive said power takeoff to drive said epicyclic gear system.

4. The gas turbine engine as set forth in claim 2, wherein said shaft rotates with said low pressure compressor to drive said power takeoff to drive said epicyclic gear system.

5. The gas turbine engine as set forth in claim 1, wherein a throttle valve is positioned downstream of said hydraulic pump and is controlled to restrict the flow from said hydraulic pump to in turn control the resistance on rotation of said ring gear.

6. The gas turbine engine as set forth in claim 1, wherein a resistance control selectively controls the resistance such that said boost compressor rotates at higher speeds during higher power operation of the gas turbine engine, and is rotating at slower speeds during lower power operation.

7. The gas turbine engine as set forth in claim 1, wherein a friction brake provides said resistance to rotation of said ring gear.

8. The gas turbine engine as set forth in claim 1, wherein a friction brake provides said resistance to rotation of said one of said gears.

9. The gas turbine engine as set forth in claim 8, wherein a resistance control selectively controls the resistance such that said boost compressor rotates at higher speeds during higher power operation of the gas turbine engine, and is rotating at slower speeds during lower power operation.

10. The gas turbine engine as set forth in claim 2, wherein said speed control changing the relative speeds between said input and said outlet to achieve a desired pressure in the air passing to said location to be cooled.

11. The gas turbine engine as set forth in claim 1, wherein said shaft rotates with a lower pressure compressor to drive a power takeoff to drive said epicyclic gear system.

12. The gas turbine engine as set forth in claim 1, wherein said speed control changing the relative speeds between said input and said outlet to achieve a desired pressure in the air passing to said location to be cooled.

13. The gas turbine engine as set forth in claim 1, wherein said speed control incorporates a system for selectively providing a resistance to one of the gears in said epicyclic gear system.

14. The gas turbine engine as set forth in claim 13, wherein said one of said gears is a ring gear.

15. The gas turbine engine as set forth in claim 13, wherein a hydraulic pump rotates with one of said gears, and an output of said hydraulic pump is controlled to control the resistance on rotation of said one of said gears.

* * * * *